United States Patent [19]

Manzione

[11] Patent Number: 4,534,003
[45] Date of Patent: Aug. 6, 1985

[54] OPTIMIZED REACTION INJECTION MOLDING

[75] Inventor: Louis T. Manzione, Summit, N.J.

[73] Assignee: AT&T Bell Laboratories, Murray Hill, N.J.

[21] Appl. No.: 295,721

[22] Filed: Aug. 24, 1981

[51] Int. Cl.$^3$ .................. G06F 15/46; B29G 3/00
[52] U.S. Cl. ........................ 364/476; 264/327; 264/328.1; 264/328.2; 264/510; 264/578; 425/542; 425/543
[58] Field of Search ............... 364/174, 473, 476, 496, 364/500, 578, 509, 510; 425/145, 542, 543; 264/328.6, 328.2, 327, 328.1, DIG. 77

[56] References Cited

U.S. PATENT DOCUMENTS 4,035,467 7/1977 Campbell et al. ...... 264/DIG. 77 X
4,338,068 7/1982 Suh et al. ................. 264/327 X

OTHER PUBLICATIONS

Broyer, Ephriam and Christopher Macosko, 'Heat Transfer and Curing in Polymer Reaction Molding', U. of Minn., AICHE, 1976.
Domine, Joseph and Costas Gogos, 'Simulation of Reactive Injection Molding', Polymer Eng. and Science, vol. 20, No. 13, 1980.
Domine, Joseph, 'Computer Simulation of the Injection Molding of a Liquid Undergoing Linear Step Polymerization', 1976.
Huang, Chieh-Fong, 'Simulation of the Cavity Filling Process with Marker and Cell Method in Injection Molding', 1978.
Castro, Jose Mario, 'Mold Filling and Curing Studies for the Polyurethane Rim Process', 1980.
Lee, Ly James, 'Analysis of Polyurethane RIM', 1979.

*Primary Examiner*—Errol A. Krass
*Assistant Examiner*—Kevin J. Teska
*Attorney, Agent, or Firm*—James H. Fox

[57] ABSTRACT

Articles made by the reaction injection molding process obtain a reduced residence time in the mold, hence increasing the production rate, by choosing processing and material parameters according to the inventive method. This method makes use of material parameters and processing conditions, including temperature and cavity shape for determining the viscosity of prepolymer material as it solidifies in the cavity. This information is used to optimize fluid injection rates, temperature of the fluid or cavity wall, choice of reactive fluid, or shape of the cavity. Articles having more complex geometries than previously obtained can be produced when the cavity filling is mathematically simulated according to the present procedure, typically by means of a computer. This can ensure against blockage of critical passages in the cavity, polymer degradation, etc.

9 Claims, 23 Drawing Figures

FOUNTAIN FLOW

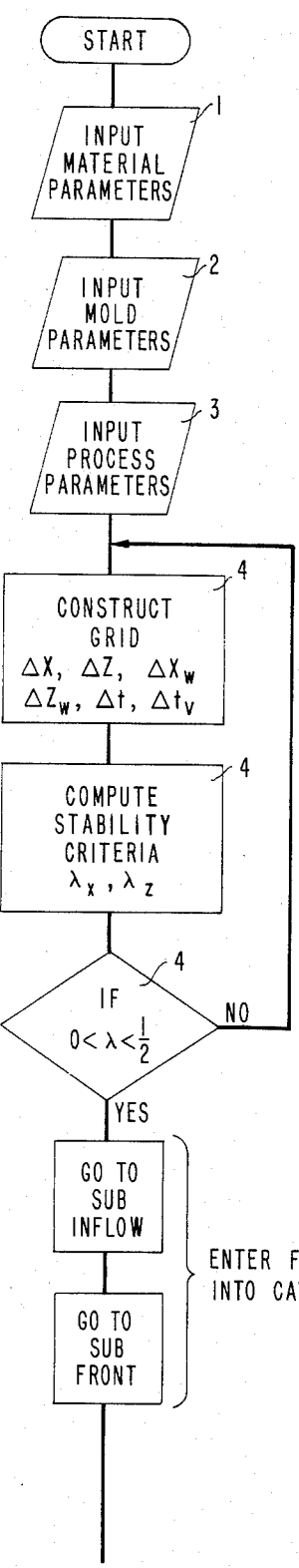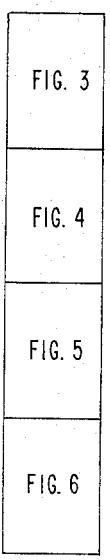
FIG. 3
FIG. 7
FIG. 8
KEY TO SYMBOLS

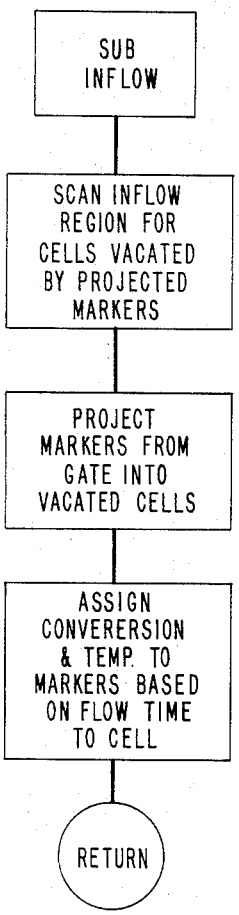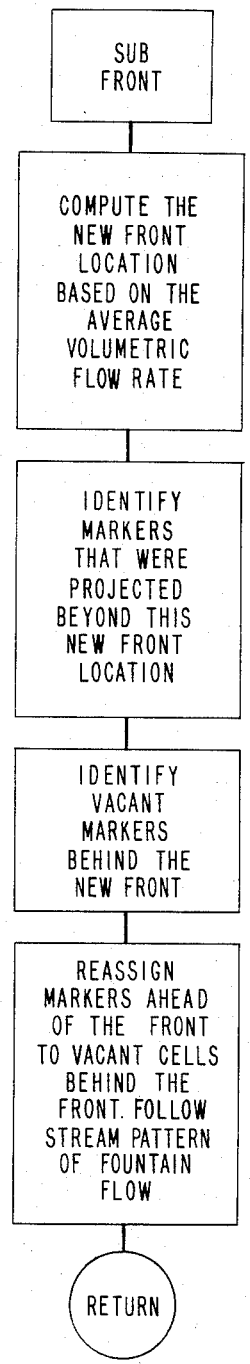

OPTIMIZED REACTION INJECTION MOLDING

BACKGROUND OF THE INVENTION

1. Field of the Invention

This invention relates to a method of reaction injection molding of thermosetting polymeric material, whereby procedures are utilized to optimize parameters relating to the molding process.

2. Description of the Prior Art

Reaction injection molding (RIM) is polymerization and processing in a single cyclic operation. It consists of several distinct processes. Reservoirs of one, two, or more components are metered according to a predetermined ratio and then conveyed under pressure to a mixing head. The fluids are either mixing activated in the head or thermally activated upon injection into the mold cavity. Typical polymer resins utilized in RIM include polyurethane, epoxy, polyester, and nylon, with other thermoset materials being possible.

Injection into the mold is usually at modest mass flow rates to insure smooth laminar filling and avoid instabilities commonly known as fingering. Considerable viscosity increase can occur during cavity filling; the extent depending on the fill time and resin reactivity. Most of the chemical conversion usually occurs during the mold curing step after the mold has been filled. The part is ejected after some fixed mold residence time which allows the part to attain dimensional stability. A thermoset part may be ejected while still hot because it is crosslinked, but a post cure treatment may also be required. The cycle time includes the time for cavity filling, mold curing, and mold preparation, and it is typically desirable for it to be a minimum. Excessive cycle times due to long cure times may eliminate or limit the use of a molding resin in a particular application.

Material and process parameters determine the moldability of a resin in a particular application. Characteristic properties of a resin such as the gel time and the time to attain an ejectable rigidity are strongly influenced by temperature, both the temperature of the components and the mold temperature. Higher temperatures provide for more rapid reactions and shorter reaction times, but they can also increase the viscosity rise during cavity filling and the maximum exotherm temperature. Too high a resin viscosity during cavity filling can lead to plugging the cavity before it is completely filled, referred to as a "short shot". The necessity to avoid this effect can limit the design complexity of the cavity to only simple shapes that can be rapidly filled. Thermal runaway is often encountered in reactive polymer processing, and it is often desirable to minimize the cycle time. High exotherm temperatures are particularly important when they can result in polymer degradation or damage to an encapsulated electronic device.

In the past, to reconcile the various material and processing parameters typically required constructing a mold and attempting to fill it with the desired resin. If any of the various problems noted above (among others) occurred, then the mold had to be redesigned or the resin changed. Mold design is typically a costly custom process. Furthermore, with little assurance that a new design will work, mold shapes and processing cycles are necessarily more conservative than would be the case if more accurate mold filling information were available.

SUMMARY OF THE INVENTION

I have invented a method of evaluating and optimizing the reaction injection molding of thermoset resins. The method consists of mathematical simulations, whereby cavity filling is simulated with a marker and cell method. The input variables for the simulation include material constants, mold geometry, and process conditions. The results indicate the complexity and nonuniformity of various resin parameters during and after cavity filling. The resin parameters that can be determined include (1) chemical conversion; (2) temperature; (3) viscosity; (4) velocity; and (5) pressure. One or more of these parameters are utilized to improve the molding process or choice of resin material. For example, by determining viscosity of the material, premature gelation or flow seizure can be avoided, while decreasing the overall mold residence time. The resin parameters are determined by assigning the material parameters of the resin, assigning markers and computing conversion and temperature fields for the resin in the cavity, iterating the computations, assigning viscosity values to the markers, computing velocity vectors, and moving the markers.

BRIEF DESCRIPTION OF THE DRAWINGS

FIGS. 3-10 show a flow chart for determining the relevant parameters during the mold filling and curing operation;

DETAILED DESCRIPTION

The following description relates to a method of optimizing the reaction injection molding process for making an article. An initial description is given of the mold filling and curing analysis below. Next is provided detailed step-by-step notes for the analysis.

Simulation of reactive cavity filling is important in the determination of moldability because it allows prediction of, among other things, the viscosity and temperature rise of the resin. As noted above, it is not uncommon for the resin to gel prematurely before the entire mold has been filled, producing a short shot. Cavity filling simulation not only helps to avoid premature gelation, but it can be used to optimize the process by allowing the most reactive resins to be molded. It also provides the initial conditions for the subsequent analysis of the cure in the mold cavity once filling has been completed.

Most reaction injection mold filling is under conditions of constant volumetric flow rate because most units are equipped with gear driven pumps. The alternate condition of a constant-pressure driven flow where the flow rate can vary with the viscosity of the fluid is also included in the present analysis by providing an additional convergence on the overall pressure drop. This convergence ensures that the overall pressure drop is not exceeded.

Figure 11:
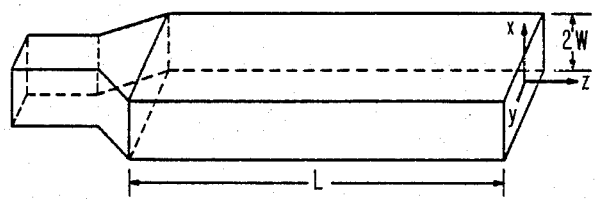
FIG. 11 shows a typical mold cavity, as used in Examples 1-3.

The mold cavity is assumed to be of relatively simple geometric cross section; see, e.g., FIG. 11. Complex cavities can also be treated with the present technique.

This can be accomplished by representing a more complex shape as a combination of simpler shapes, or by modeling the more complex shape by a simple shape having a flow length representative of the longest flow length in the more complex shape. Circular shapes can also be accommodated by expressing the equations below in cylindrical coordinates. The mold volume is divided into a large number of cells in accord with common finite difference methods of solution. Both cylindrical and slab mold geometries result in axisymmetric flows; hence, only two dimensional cells running the length of the cavity are required. Cell size is determined by mold geometry and resin properties such as the thermal diffusivity, as further specified in Note 4 below.

MOLD FILLING

Cavity filling is simulated using a modification of the simplified marker and cell (SMAC) method, a finite difference method that is able to treat free surface fluid flows. Marker and cell has previously been applied to cavity filling with thermoplastic melts, but the present effort is believed to be the first use of SMAC for reactive fluids. The cells are characterized according to whether they are solid-fluid boundaries, free slip or no-slip boundaries, inflow or outflow surfaces. In successive time increments, markers representing fluid elements enter and move through the cavity according to prescribed governing equations. A fixed number of markers enters the cavity in the given time interval corresponding to the fixed volume flow rate. A marker is associated with each filled cell, and each marker carries information on the temperature and conversion of the fluid in that particular cell.

The temperature profile, for the usual case where a temperature gradient develops during filling, is computed from the energy balance which describes the temperature change due to conduction, convection, and heat of reaction; see Note 6 below.

Figure 1:
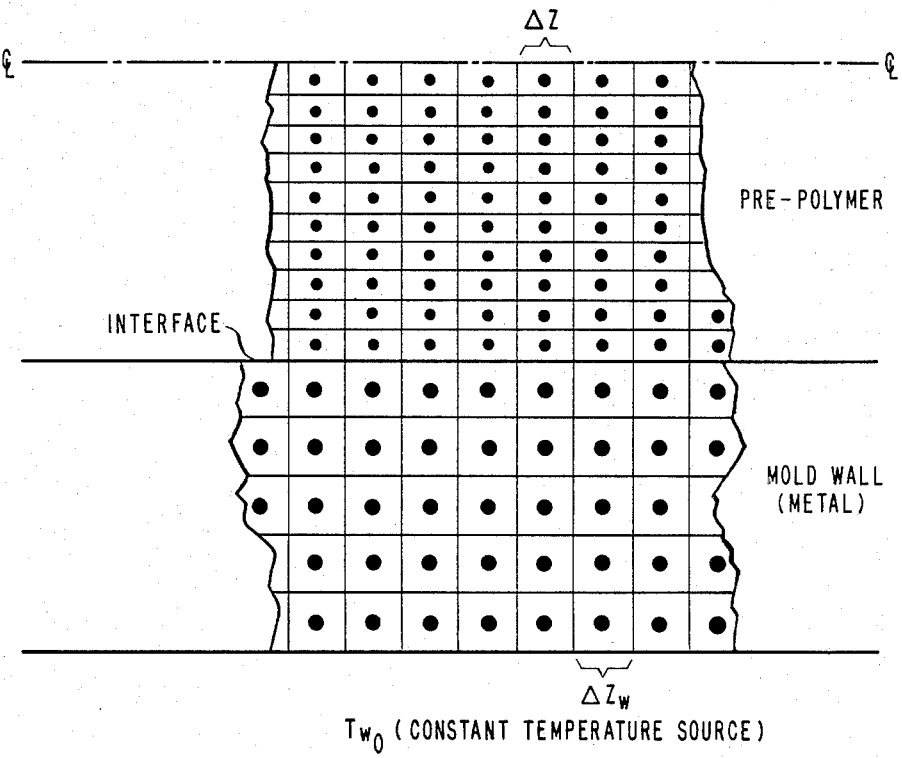
FIG. 1 shows the finite difference solution as applied in two meshes, one for the mold and one for the resin.

The density, specific heat, and thermal conductivity can typically be assumed to remain constant. Although this is perhaps not correct over the entire transformation from fluid to solid polymer, it is a much better assumption when restricted to the early stage of cure as it is in the filling analysis. However, empirical relations for the physical constants are preferable, and they can be easily incorporated when they are available. An $n^{th}$ order kinetic expression can be used to represent the rate of chemical reaction. The energy balance is then written as an explicit difference equation. Explicit finite difference methods are straightforward to apply, but they only converge over a certain range of the dimensionless time increment. The temperature field for transient conduction and chemical reaction (convective terms dropped) is in good agreement with previous reports using implicit methods, various limiting conditions such as adiabatic reaction, and analytical solutions of conductive heat transfer. The temperature of the mold wall is obtained by employing a similar finite difference solution, requiring a different mesh, in the mold wall (see FIG. 1). The interface temperature is determined with a convective film heat transfer coefficient found from simple heated tube flow experiments and empirical correlations where applicable.

The concentration field is obtained by writing the mass balance on a single component. The stoichiometric ratio should also be included if a stoichiometric imbalance is present; see Note 6 below. The diffusion term can be neglected to simplify the expression if the diffusion length is much less than the cell dimensions. Diffusivity as a function of temperature and conversion should be used if diffusion is considered and the Stokes-Einstein expression for diffusivity is appropriate in this regard; see R. B. Bird et al, *Transport Phenomena*, John Wiley & Sons, Inc., New York (1960), page 399. The mass balance is also written as an explicit finite difference equation and solved simultaneously with the energy balance for the concentration and temperature field.

The viscosity of the fluid in each cell can then be calculated from the chemical conversion and the temperature using an empirical relation. An example suitable for the urethane material used herein is given in Note 1 below; see J. M. Castro et al, *S.P.E. Technical Papers*, ANTEC, New York, May 1980, page 434. Other fluid model formulas can be used as appropriate for materials other than the urethane used in the Examples herein. These constitutive relations for thermoset materials are relatively simple in that they do not include any non-Newtonian or elastic behavior. This assumption is valid for most low viscosity resins at low conversion.

The velocity field can be computed once the viscosity field is known. The momentum balance for the axial component of the velocity behind the front is then computed; see Note 8 below. The temporal term is dropped since this expression is applied at each time interval and in that way responds to the time-dependent viscosity field. The transverse velocity ($v_x$) is obtained through continuity assuming a lubrication flow since the aspect ratio of the tube is large. In Equations 11-14 below, $v_z$ and $v_x$ velocity components are again obtained through a finite difference solution and the components combined into a representative velocity vector. The markers are then moved into new cells in response to their velocity vectors and the duration of the time interval. Markers near the center of the cavity, for example, usually have larger axial velocities than those near the wall, and they move the greater distance. Cells near the gate of the mold, vacated by markers that have moved further into the cavity, are filled by markers moving in through inflow cells at the gate. Logic limits in the process confine the markers inside the cavity and prevents them from crossing boundary cells.

Figure 2:
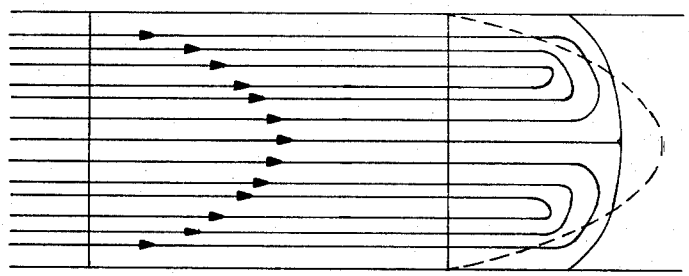
FIG. 2 shows streamlines that define a fountain flow.
Figure 4:
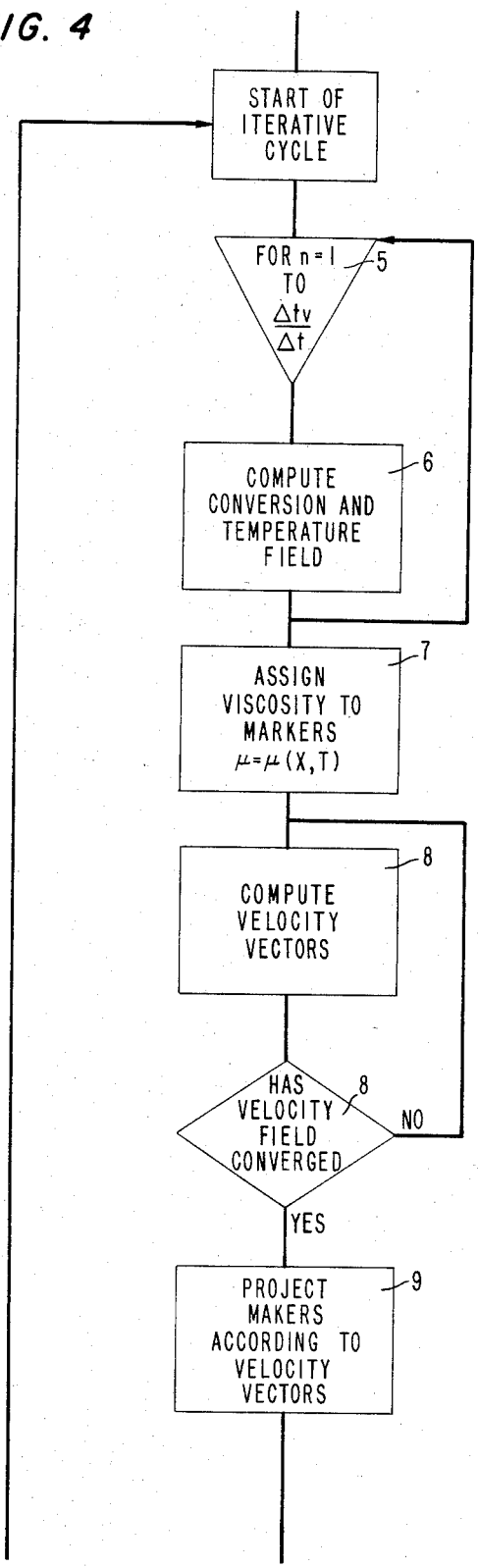
Figure 5:
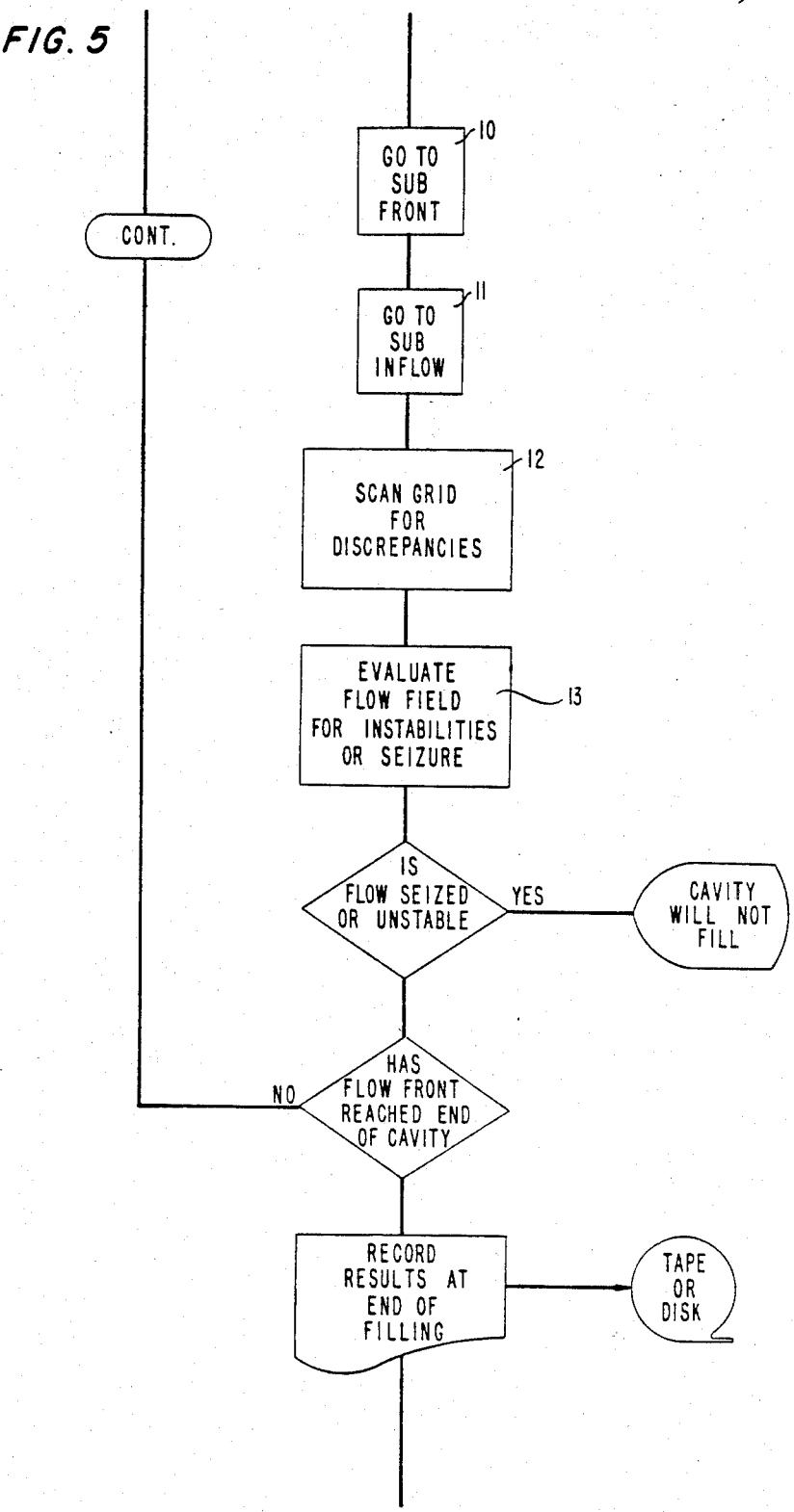
Figure 6:
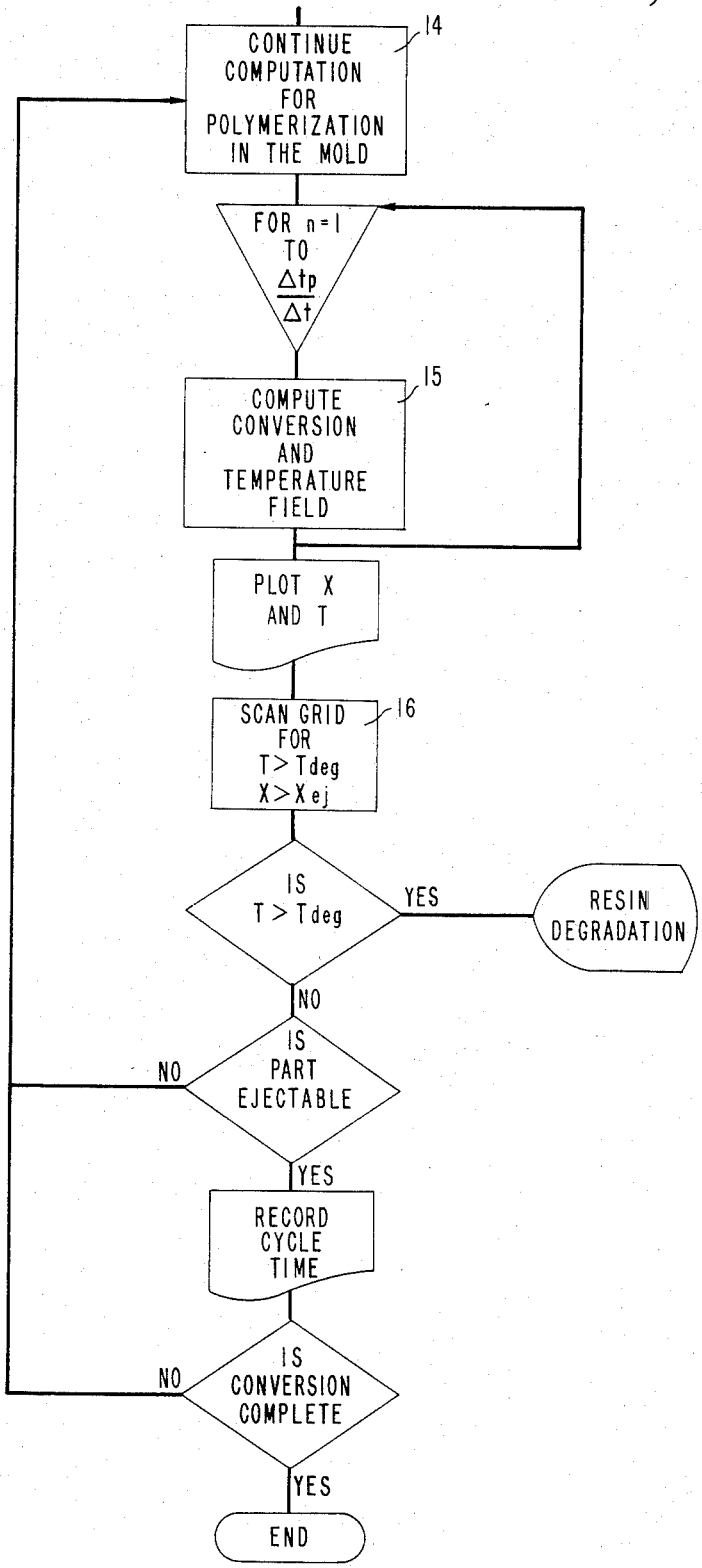

Markers near or at the front are required to follow the streamlines that define a fountain flow. Fountain flow is a transient fluid flow pattern found in the filling of thin cavities with viscous fluids; see Z. Tadmor, *Journal of Applied Polymer Science*, Vol. 18, (1974), page 1753. The streamlines were arrived at from previous reports on fountain flow and two component injection molding. The streamlines are shown in FIG. 2. This treatment of fountain flow, identical to that of Lord and Williams (see H. A. Lord et al, *Polymer Engineering Science*, Vol. 15(8), (1975), page 569) allows the incorporation of the effects of fountain flow on the residence time distribution, yet avoids the mathematical difficulties associated with the moving contact line. Variation of the stream pattern used did not cause any noticeable difference in the resulting temperature and conversion profiles found after cavity filling. This indicates that an exact solution of the fountain flow is probably not required for this type of moldability analysis as long as it is considered.

Once all the markers have been moved, a scan is made of all the cells behind the new front to find any cells that do not have markers, or cells that have two or more markers. This problem, which is not common, is due to the discretization of the otherwise continuous fluid flow. A new marker is created in an empty cell by averaging the information of adjacent markers. Multiple markers in a single cell are likewise averaged to produce a single representative marker.

A new cycle is started when this scan is complete. The time increment counter is increased and a new temperature, concentration, viscosity and velocity field found from the coupled balance equations. The markers are moved, new markers enter the cavity, and the entire grid scanned for discrepancies. The time increment used for the finite difference solution of the coupled mass and energy balance is typically too short to provide any significant marker movement. The markers are thus moved after some longer time increment, usually equal to 10 to 100 of the smaller increments, depending on the time increment required for convergence and the volumetric flow rate.

The velocity profile at any cross section of the cavity must provide the given volumetric flow rate. The pressure drop serves as the normalizing parameter to satisfy this important condition of the incompressible flow. The cycle is repeated as long as the results are of interest or until the flow front has reached the end of the mold cavity. Temperature, conversion, viscosity and velocity profiles within the cavity at each time increment are obtained in this manner. Tabular results can be presented intermittently on a CRT screen, less frequently as printed output, and plotted on command when the front has reached the end of the cavity or when the intermediate result is of particular interest.

Mold Curing

Conversion and temperature profiles in the mold cavity after filling is complete are obtained by again solving the coupled energy and material balance numerically with the specific boundary conditions that are to be imposed and the appropriate parameters of the molding resin. The material is stationary, no convective terms are used, and no markers are moved. The diffusion term, often found to be much less than the rate of reaction when the reaction is rapid, can be neglected if it was neglected in the filling analysis or if the diffusivity can be estimated and compared to the rate of reaction. Diffusivity is usually negligible at the stages of cure where large concentration gradients are found. The heat capacity, thermal conductivity, and the density are all typically assumed to remain constant as a first approximation. Empirical relations for physical properties are preferable and are easily accommodated if available. In general, the same procedure applied in the filling simulation is continued, but there is opportunity at this point to introduce new physical constants or a time increment more suited to later stages of cure.

The present invention considers the general reaction molding problem, since a numerical solution is obtained for the temperature and conversion profiles that incorporates the curing that occurs during cavity filling. The mold wall is treated in the same manner as in the filling analysis; that is, the separate finite difference solution for the temperature profile in the mold wall that couples to the solution inside the cavity is continued to provide a realistic boundary condition. The results obtained when uniform initial conditions are assumed are in good agreement with previous reports and with the various limiting conditions such as adiabatic molding. The initial conditions of conversion and temperature are established from the flow of the reactive fluid into the mold cavity as previously derived. In the absence of such coupling, there is no axial variation in the profiles down the length of the cavity, and significant differences are found in the origin and nature of the thermal runaway that is observed.

PROCESS NOTES

The following process notes are used in conjunction with the flow chart of FIGS. 3-10 to illustrate in more detail the steps of the molding filling and mold curing analysis. The symbols and nomenclature used are given in Table I below. In this Table, $\exp[x] = e^x$.

1. A kinetic model and a fluid model of the molding resin are required. A typical kinetic model is an $n^{th}$ order irreversible reaction $$dC_A/dt = k_o \exp[E_k/RT] C_A^n \quad (1)$$

The fluid model expresses viscosity of the resin as a function of conversion and temperature. For the urethane material used in the Examples 1-3 herein;

$$\mu = \mu_\infty \left[ \frac{k_1 X_{gel}}{X_{gel} - X} \right]^{k_2 X} \exp(E_a/RT) \quad (2)$$

(Other fluid models for other materials are known in the art, or can be determined as required for use with the present analysis.) Input $k_o$, $E_k$, n, $C_{Ao}$, $X_{ej}$, $H_r$, $\mu_\infty$, $E_a$, $X_{gel}$, $k_1$, $k_2$.

Also, input the physical constants of the material $$k_T, C_p, \rho, D_{AB}, T_{deg}.$$

Note: $k_T(T)$, $C_p(T)$, $\rho(T,X)$, $D_{AB}(X,T)$ may be used if known.

2. Input the dimensions and physical properties of the mold. Input $W_c$, $W_m$, $k_{Tw}$, $C_{pw}$, $\rho_w$.

3. Enter the process parameters $T_{wo}$, $T_o$, $<v_z>$,

Instead of a uniform initial temperature, you may specify $T_{wo} = T_{wo}(Z)$.

4. Determine the grid spacing and time increment such that the stability criterion is met; that is, the following parameter $\lambda$ is less than $\frac{1}{2}$ (see B. Carnaham et al, *Applied Numerical Methods*, John Wiley & Sons, Inc., New York (1969), page 432).

$$\lambda_x = \frac{\Delta \tau_x}{(\Delta x)^2} \qquad \Delta \tau_x = \frac{\alpha \Delta t}{(2W_c)^2} \quad (3)$$

$$\lambda_z = \frac{\Delta \tau_z}{(\Delta z)^2} \qquad \Delta \tau_z = \frac{\alpha \Delta t}{(2W_c)^2} \quad (4)$$

Maintain $\Delta t$ near 1/100 second and adjust $\Delta x$ and $\Delta z$ to provide $\lambda_x$ and $\lambda_z$ near $\frac{1}{4}$. Typical values are $\lambda x = 0.03$ and $\Delta z = 0.05$.

Try to keep $\Delta z_w = n \Delta z$ where n is an integer usually not exceeding 5. Set $\Delta x_w$ such that $$\lambda_w = \frac{\Delta \tau_w}{(\Delta X_w^*)^2} = \frac{1}{4} \quad (5)$$

where $$\Delta T_w = \frac{\alpha_w \Delta t}{W_m^2} \tag{6}$$

Also, enter an appropriate time increment ($\Delta t_v$) after which the markers are moved. This should be about 10 to 100 times the smaller increments ($\Delta t$).

Select an appropriate time interval to plot conversion and/or temperature during the analysis of cure in the mold cavity ($\Delta t_p$). The plot will be the only record of these intermediate results since the data set is typically too voluminous to store.

5. Compute the conversion and temperature field at each $\Delta t$ within the larger $\Delta t_v$.

6. The following coupled material and energy balance must be solved. Write these expressions as explicit finite different equations and solve for $T_{new}$ and $C_{new}$ from conditions at the previous time interval (C, T). (See Carnaham reference above.)

$$\rho C_p \left[ \frac{\delta T}{\delta t} + v_z \frac{\delta T}{\delta z} \right] = k_t \left[ \frac{\delta^2 T}{\delta x^2} + \frac{\delta^2 T}{\delta z^2} \right] + \tag{7}$$

$$k_o \exp[-E_k/RT]C_A{}^n H_r$$

$$\frac{\rho C_A}{\delta t} + v_z \frac{\delta C_A}{\delta z} = D_{AB}(X, T) \left[ \frac{\delta^2 C_A}{\delta x^2} + \frac{\delta^2 C_A}{\delta z^2} \right] - \tag{8}$$

$$k_o \exp[-E_k/RT]C_A{}^n$$

In each small time increment $\Delta t$, start the computation of the temperature and conversion at that particular axial position by solving for the interface temperatures—these serve as the boundary conditions for the solutions in the cavity and in the mold wall.

The temperature of the fluid in the cell adjacent to the mold wall is found from the following treatment:

$$\rho C_p \left[ \frac{\delta T}{\delta t} + v_z \frac{\delta T}{\delta z} \right] = k_T(T) \left[ \frac{\delta^2 T}{\delta x^2} + \frac{\delta^2 T}{\delta z^2} \right] + \tag{9}$$

$$k_o \exp[E_a/RT]C_A{}^n H_r + h_f(T_w - T)$$

where $T_w$ is the temperature of the first cell in the mold wall.

Likewise, the temperature in the first cell in the mold wall is evaluated in that time increment by:

$$\rho_w C P_w \left[ \frac{\delta T_w}{\delta t} \right] = k_{Tw} \left[ \frac{\delta^2 T_w}{\delta x^2} + \frac{\delta^2 T_w}{\delta z^2} \right] + h_f(T - T_w) \tag{10}$$

Compute the temperature profile across the fluid and mold once these interfacial conditions are known. Move to the next axial position once the profile at the current axial position is obtained.

7. Assign a new viscosity to each marker using a constitutive relation for thermoset fluid (discussed in Note 1).

8. Compute the velocity vector associated with each marker.

(1) compute the axial or Z component of the velocity vector by solving the following momentum balance written as a finite difference equation $$\frac{\delta^2 v_z}{\delta x^2} + \frac{1}{\mu(x)} \frac{d\mu}{dx} \frac{dv_z}{dx} = \frac{1}{\mu(x)} \frac{dp}{dz} \tag{11}$$

At each axial position (a column of markers all having the same axial or z subscript), start by assuming the pressure drop (dp/dz) of the previous column of cells. Obtain the axial component of the velocity vectors for this column using this pressure drop in the previous column. Determine the mass flow rate for this column. It has to agree with the overall mass flow rate in general and the mass flow rate in the previous column in particular. If the average viscosity has increased over the value in the previous column, the mass flow rate will be lower. Adjust the pressure drop in the current cell until the mass flow rate in the current cell equals (to within an epsilon typically less than 1 percent of the pressure drop) the mass flow rate in the previous cell, which should be the same as the overall mass flow rate.

Once the axial components are known ($v_z$), obtain the transverse component by applying the continuity equation as a difference relation.

$$\frac{\delta v_x}{\delta x} + \frac{\delta v_z}{\delta z} = 0 \tag{12}$$

9. The distance the markers travel in the velocity time increment ($\Delta t_v$) is simply $$d_z = v_z \Delta t_v \tag{13}$$

$$d_x = v_x \Delta t_v \tag{14}$$

The number of axial cells traveled is then the integer value of ($v_z \Delta t / \Delta z$). The number of transverse cells moved is ($v_x \Delta t / \Delta x$). (Note that $v_x$ can be positive or negative; hence, markers can move toward or away from the cavity wall.)

10. Subroutine FRONT is essentially a rearrangement of the markers in the front region. The final result is insensitive to the exact nature of this rearrangement as long as the central fluid moves toward the wall. See the flow chart of the front subroutine.

11. Subroutine INFLOW is a routine that enters markers (or fluid) into cells vacated by markers that were projected deeper into the cavity. The age of these markers should be graded according to their flow time to reach the intended cell. Five discrete age groups are adequate to describe this fluid. Concentration can be computed from this age. Temperature due to heat of reaction should be accommodated. Temperature change due to conduction over this short flow path can be neglected. See flowchart of INFLOW subroutine.

12. Discrepancies, such as vacant cells in the fluid flow, occur occasionally due to the discrete nature of the marker movement. A relatively large number of discrepancies, such as several percent of the total number of markers, will not cause any problem as long as they are detected and corrected in each $\Delta t_v$.

Detect discrepancies in the following way. Associate a flag with each cell behind the fluid front. Increment the flag when a marker is projected into the cell. Likewise increment flags in the INFLOW region when markers are projected into them from the gate. Scan the flags in the entire grid behind the fluid front after all markers have been projected. Normal cells will show the correct, uniform, flag value. If a cell was missed, its flag value will be one or more counts low. Fill the cell by averaging the information of the adjacent cells and set the flag to the correct count.

Check the flag value prior to projecting a marker into that cell. Average the information of the present marker with the information of the marker to be projected in to obtain a single representative marker. Set the flag to the correct count.

13. Scan velocities over the entire grid to determine if the velocity is exceeding the stable laminar flow limit or if the flow has seized, that is $v_z \rightarrow 0$ over an entire cross section of the cavity.

14. Continue to solve the coupled material and energy balance during polymerization in the mold cavity.

15. Solve the coupled material and energy balance as in the filling analysis, but drop the convective terms. Also, bypass the marker movement and grid scan.

16. Monitor the grid for complete conversion or degradation. Document the cycle time and/or the presence of degradation. Continue until the conversion is complete.

TABLE I

| | Nomenclature |
|---|---|
| $C_A$ | reactant concentration |
| $C_{Ao}$ | initial reactant concentration |
| $C_p$ | specific heat |
| $D_{AB}$ | diffusivity |
| $E_k$ | activation energy for chemical reaction |
| $E_a$ | activation energy for fluid flow |
| $H_r$ | heat of reaction |
| $h_f$ | convective heat transfer coefficient |
| $k_i$ | empirical constants for viscosity relation; i = 1,2 |
| k | reaction rate constant |
| $k_o$ | frequency factor for chemical reaction |
| $k_T$ | thermal conductivity |
| L | cavity length |
| n | order of chemical reaction |
| o | as a subscript denotes initial conditions |
| p | pressure |
| R | gas constant |
| t | time |
| $\Delta t, \Delta t_v, \Delta t_p$ | time increments for solution, marker movement, and plotting |
| T | temperature |
| $T_{deg}$ | degradation temperature |
| v | velocity |
| $<v_z>$ | average velocity |
| x, y, z | cavity coordinates |
| X | chemical conversion |
| $X_{gel}$ | conversion at gelation |
| $X_{ej}$ | conversion suitable for ejection |
| $W_c$ | half-cavity thickness |
| $W_m$ | mold wall thickness |
| w | as subscript denotes wall parameters |
| $\rho$ | density |
| $\rho_w$ | density of mold wall |
| $\mu$ | viscosity |
| $\mu_\infty$ | viscosity at "infinite" temperature |
| $\lambda$ | stability criterion |
| $\alpha$ | thermal diffusivity |
| $\tau$ | dimensionless time |
| $X^*, Z^*$ | dimensionless length variables: $\frac{x}{W_c}, \frac{z}{W_c}$ |

EXAMPLE 1

The resin fluid used here for demonstration purposes is similar to a conventional RIM urethane. (Union Carbide RIM 2200, being a 2 component resin comprising methylene diisocyanate, polyol, and 1,4 butane diol.) Chemical and physical properties of this material, and mold parameters, are listed in Table II.

TABLE II

| | |
|---|---|
| $C_{Ao}$ | .0045 moles/cm$^2$ |
| $C_p$ | 0.41 cal/gm-°C. |
| $C_{pw}$ | 0.12 cal/gm-°C. |
| $D_{AB}$ | 5 × 10$^{-6}$ cm$^2$/sec |
| $E_a$ | 8,000 cal/mole |
| $E_k$ | 12,000 cal/mole |
| $H_r$ | 13,500 cal/mole |
| $k_1$ | 1.0 |
| $k_2$ | 0.6 |
| $k_o$ | 8.54 × 10$^8$ sec$^{-1}$ |
| $k_T$ | 0.0006 cal/cm-sec-°C. |
| n | 2.0 |
| $T_{deg}$ | 240° C. |
| $X_{gel}$ | 0.60 |
| $X_{ej}$ | 0.90 |
| o | 1.0 gm/cm$^3$ |
| $o_w$ | 8.02 gm/cm$^3$ |
| $k_{Tw}$ | 0.04 cal/cm-sec-°C. |
| $<v_z>$ | 1.00 cm/sec |
| $W_c$ | 0.3 cm |
| L | 12.0 cm |

Subsequent alteration of some properties to explore limits and criteria for moldability will be clearly indicated and no further listing presented. A cavity geometry similar to a common plaque mold was used. The gate area is the entire left-half side of the mold, and the fluid front moves from left to right (see FIG. 11). The cavity is assumed to be sufficiently wide, such that end effects in the y direction need not be considered. After the flow has stopped, the gate is treated as a solid wall, and the boundary conditions there and at the far wall were derived from the same finite difference solution used for the top and bottom faces. The cavity is nominally 12 cm long and 0.6 cm thick. The average fluid velocity is 1.00 cm/sec which provides a fill time of 12 seconds. This relatively low velocity is used to promote sufficient conversion in the short cavity that is required by computer hardware considerations. The results, however, could be translated into dimensionless groups to extend their applicability to a wider range of fluid properties and mold geometries.

Figure 12:
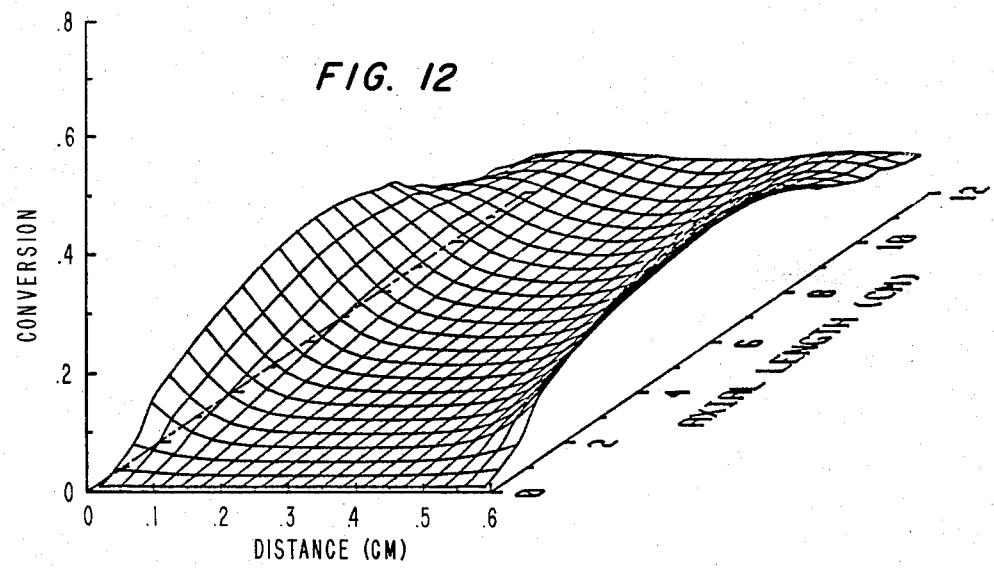
FIGS. 12-23 show the degree of conversion, temperature, viscosity, and axial velocity of the resin in the mold cavity for Examples 1-3.
Figure 13:
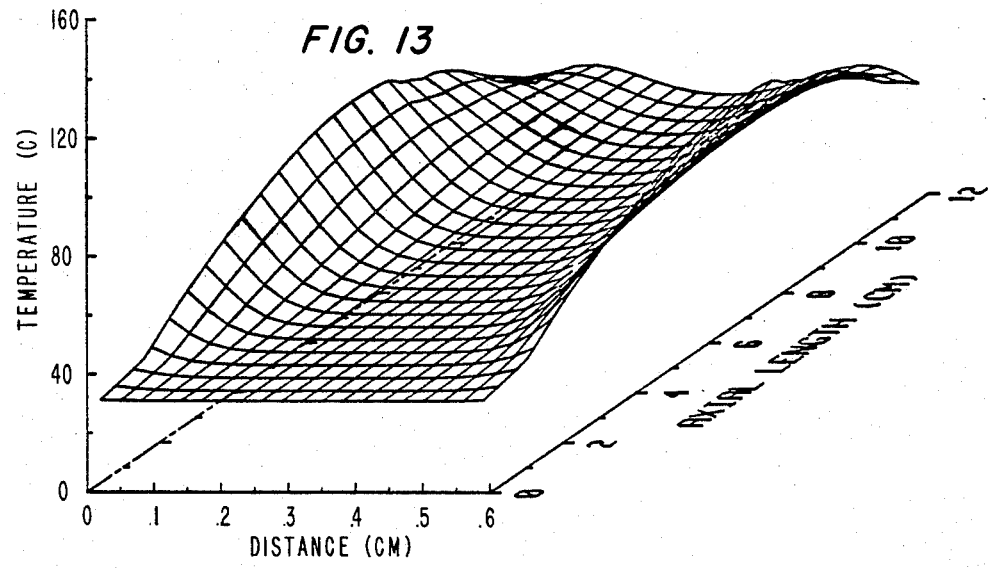
Figure 14:
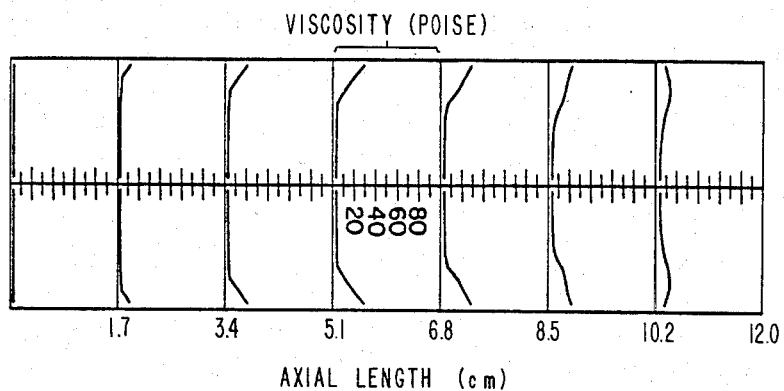
Figure 15:
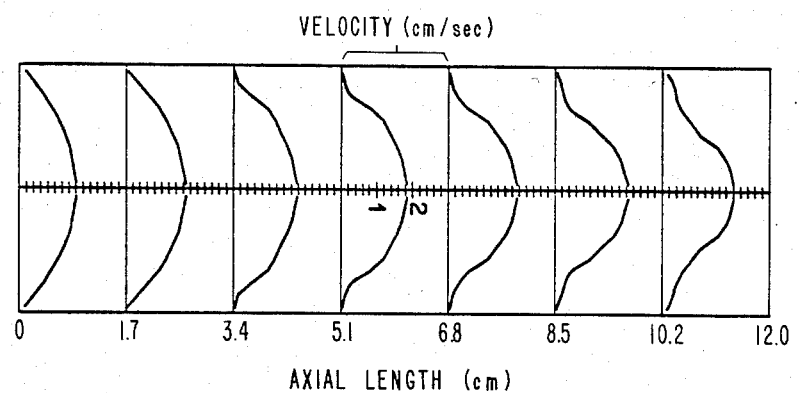

The first conditions considered are typical of reaction molding; a resin component temperature ($T_o$) of 30 degrees Celsius and a wall temperature ($T_{wo}$) of 70 degrees Celsius. Conversion, temperature, and viscosity profiles in the mold cavity at the time the flow front reaches the end of the mold are presented in FIGS. 12, 13, and 14. The axial velocity profiles at this same instant are presented in FIG. 15. Note that the oldest, most viscous fluid is located at the wall and nearer to the entrance of the cavity. The laminar flow behind the front has drawn this fluid out near the center of the cavity, forming a truncated V shape. The center of the channel contains the fresher, low viscosity fluid that had recently entered the cavity; this is clearly evident in the 3-D graphics shown in FIGS. 12 and 13. Notice how the high conversion region encroaches on the center and how the conversion of this central fluid is also slowly increasing down the length of the cavity (see FIG. 14).

There are several important implications of this simulated result. The most obvious is that the higher conversion fluid is not located at the front. A more important result is that even though a region of high conversion will usually develop at the wall somewhere down the length of the cavity, premature gelation and flow seizure will not occur there due to the relatively fresh, low temperature fluid in the center of the channel at that axial position. The flow will be halted only when gelation occurs at the front since this is the oldest central fluid. This observation is important in predicting the occurrence of a short shot. Another observation, evident in the velocity profiles down the length of the cavity, is that although the flow will not seize at the high conversion area, a growing gel layer at the wall may cause the flow to nozzle and jet into the cavity. Defective parts often result when such flow instabilities are present.

Figure 16:
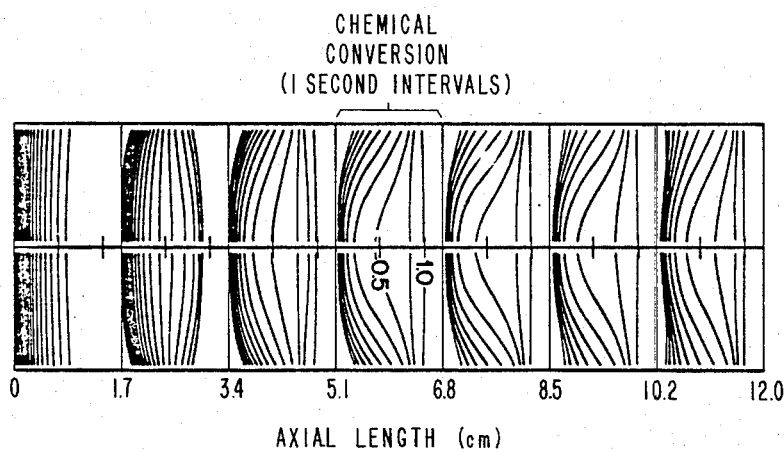
Figure 17:
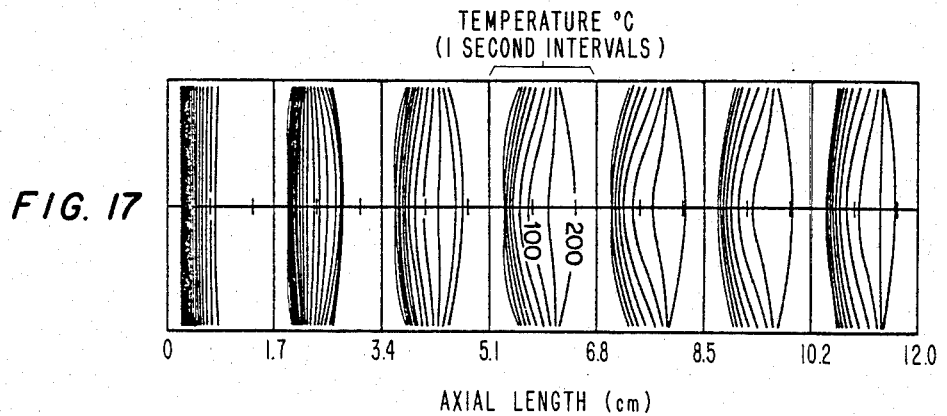

Conversion and temperature profiles at regularly spaced positions in the cavity at increasing times after filling is complete are presented in FIGS. 16 and 17. The time increment between plotted lines is 1 second, and lines after the maximum is reached at that axial position are omitted for clarity. The initial condition is the first or lowest conversion or temperature line shown. It is the condition found at the instant the mold is filled and is the two dimensional analog of FIGS. 12 and 13, respectively. The time to reach full cure or the mold residence time is evident as the time or number of lines required for the conversion to reach an ejectable level. The mold residence time in this case is an additional 19 seconds after the 12 second fill time.

Full conversion is reached at different times at different positions in the mold cavity. This reflects the differences in cure resulting from the flow of the reactive fluid. Initially, higher temperatures are found near the mold wall since the fluid there is older, has been heated, and the reaction activated. This increased wall temperature often persists during cure despite the heat lost to the wall when the fluid temperature exceeds the wall temperature at the later stages of cure. These near-adiabatic conditions result in a thermal runaway that is clearly evident in the growing conversion and temperature differences between the isochrones of FIGS. 16 and 17. Thermal runaway is the condition where the product of the temperature and concentration terms in the reaction rate is a maximum. It is a condition often found with exothermic, highly activated reactions that is similar to an explosion. The present results indicate that thermal runaway is important in reaction injection molding because it provides for the rapid reactions and short cycle times that allow the process to compete with other polymer and metal processing techniques. The present analysis thus allows thermal runaway to be achieved under proper conditions to optimize the molding parameters; i.e., decrease cycle time while avoiding flow seizure.

Thermal runaway in one region of the mold cavity does not ensure that it will spread over the entire cavity. The low thermal conductivity of polymers tends to isolate the exotherm, particularly if the cavity is wide and long, and the gate area often lags in reaching full cure. This may not be encountered in practice, however, since a short circuit is afforded by the relatively rapid conduction through the mold itself. The complete solution of the temperature profile in the mold wall correctly simulates this phenomenon, and a moderate runaway is usually found in the gate region. In cases of very rapid reactions, however, the mold may act as a thermal mass that lags and inhibits the rapid temperature rise within the cavity.

An important criteria in reaction molding is the amount, if any, of external heat required for satisfactory molding in a reasonable cycle time. This heat can be supplied directly by heating the components of the resin prior to mixing or by heating the mold. The latter is important for thermally initiating one part systems. Mold wall temperatures in excess of 100 degrees Celsius are difficult to obtain and will limit the applications of the resin. The resin components are easily heated to high temperature through heat transfer jackets on the component holding tanks. The common temperature of the components is denoted $T_o$, and the wall boundary condition is $T_{wo}$ (see FIG. 1). These can be varied independently, and the resulting temperature and conversion profiles at the time the cavity is filled reveal the extent of cure during filling. The extent of cure is far more sensitive to the component temperature than to the wall temperature, but this lack of sensitivity to $T_w$ decreases as the width of the cavity decreases.

EXAMPLE 2

Figure 20:
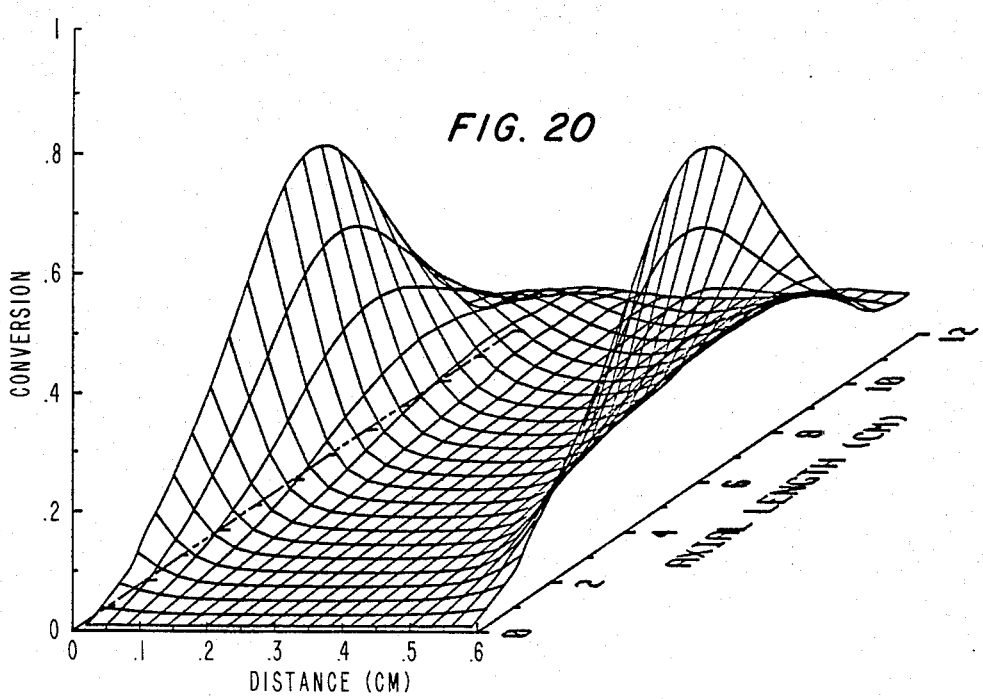
Figure 21:
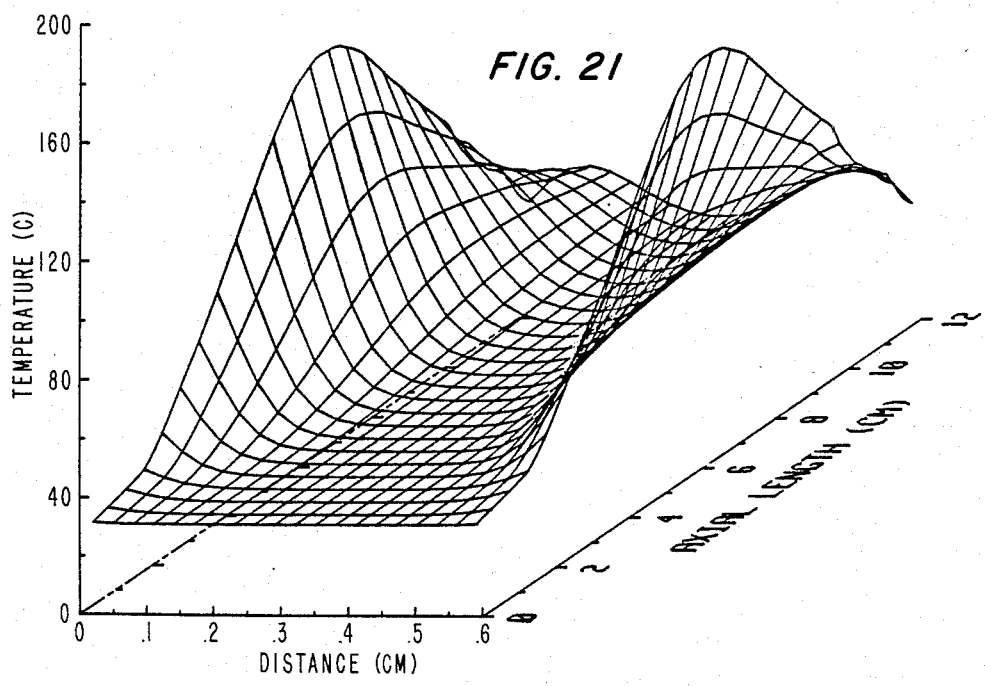

Conversion and temperature profiles after filling resulting from a wall temperature of 110 degrees Celsius (compared to 70 degrees Celsius, all else is unchanged from Example 1) are shown in FIGS. 20 and 21, representing the moment that filling of the cavity is complete. There is a considerable increase in the conversion that has occurred during filling, yet thermal runaway and flow seizure have not occurred. The overall cycle time for these conditions is shorter because greater conversion occurs during the fixed filling time. In this way, the simulation can be used to predict the greatest wall temperature that allows the cavity to fill, thereby minimizing the overall cycle time.

Figure 18:
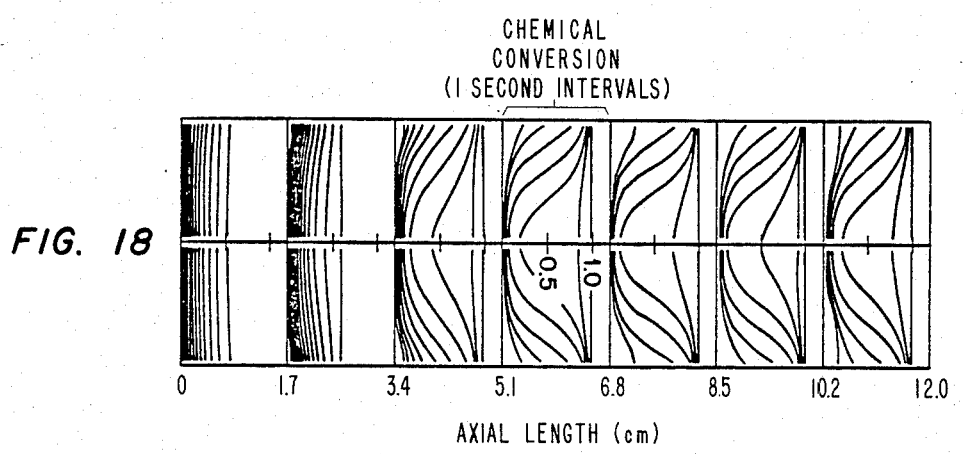

The curing analysis for these conditions is shown in FIG. 18. The reaction at the far end of the cavity is rapid, and it goes to completion in 6–8 second. The cure near the gate lags, and it requires 16 seconds to reach even an ejectable conversion of 60%. The overall time of reaction is too short to take advantage of the heating of the mold by the reaction exotherm to activate the gate region, so the additional conversion at the far end of the cavity has contributed little to reducing the overall cycle time. The mold surface will cool as low temperature fluid passes over it during filling, and there is a lag before it recovers and is heated by the exotherm.

EXAMPLE 3

Figure 19:
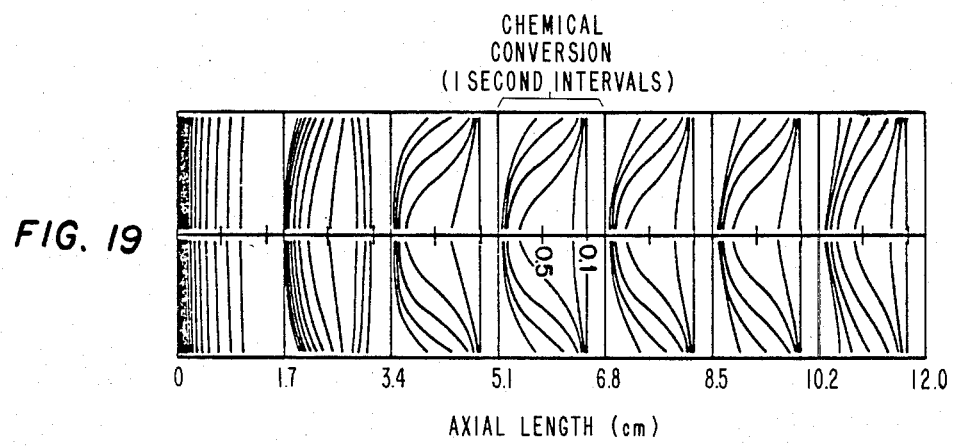
Figure 22:
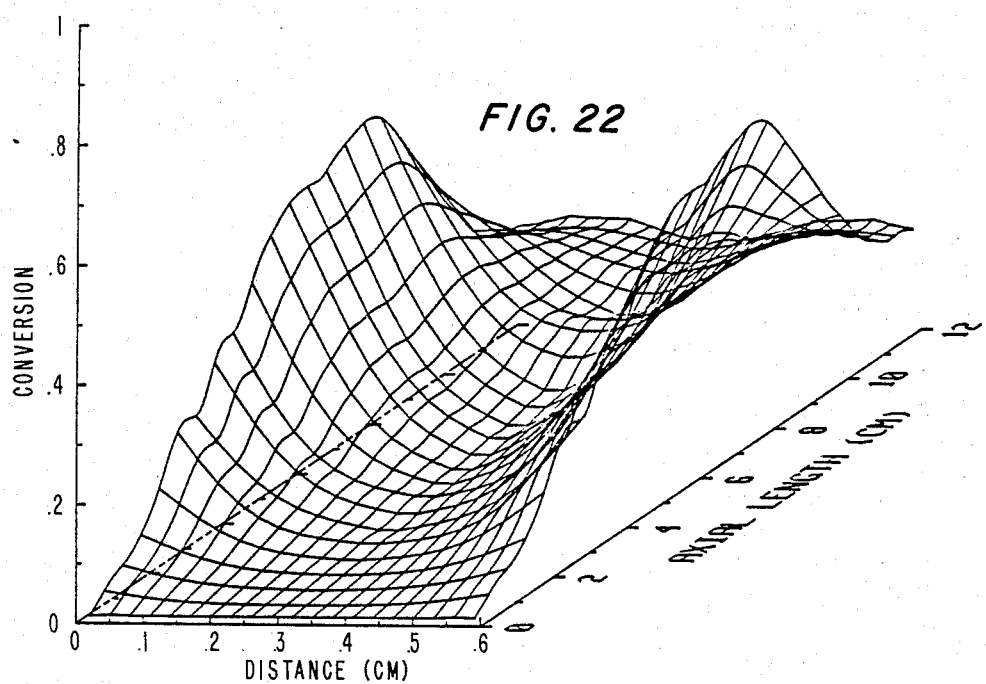
Figure 23:
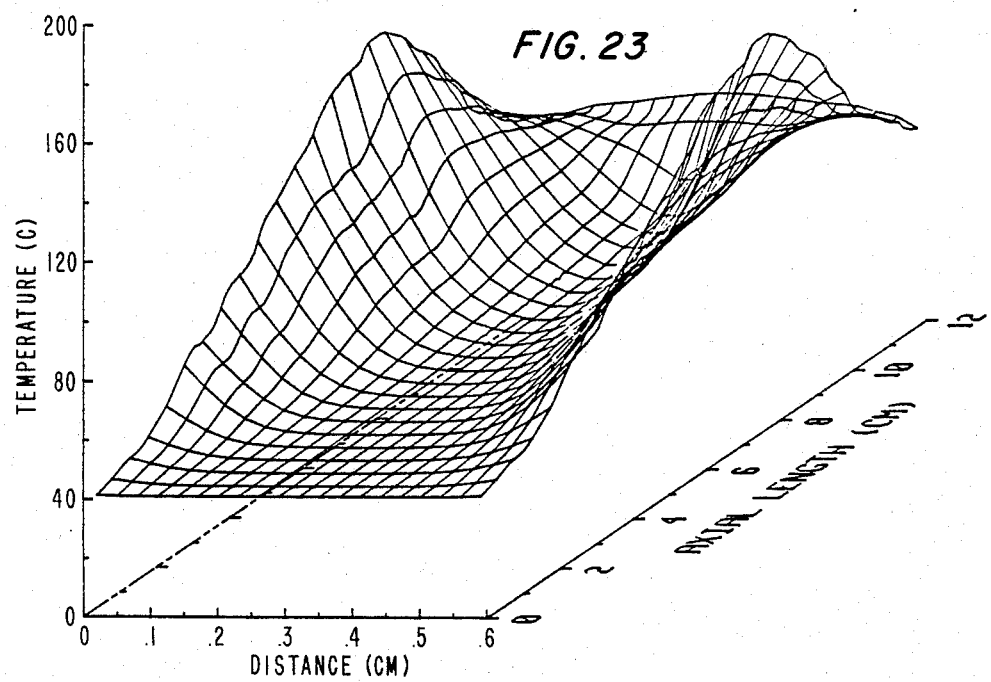

Conversion and temperature profiles resulting from cavity filling when the initial temperature of the components has been increased from 30 degrees Celsius to 40 degrees Celsius ($T_{wo}=70$ degrees) are shown in FIGS. 22 and 23, representing the moment the filling of the cavity is complete. The temperature tracks closely to the conversion, and occasionally local "hot spots" are found in both. Note the large extent of conversion, considerably more than FIGS. 12 and 13 ($T_{wo}=70$ degrees, $T_o=30$) and comparable to FIGS. 20 and 21. ($T_{wo}=110$, $T_o=30$.) In particular, there is a considerable increase in the centerline conversion and temperature at the end of the cavity. The centerline conversion and temperature are far more important than the wall conditions since they precipitate thermal runaway. Subsequent analysis of cure in the mold cavity after filling is completed (see FIG. 19) shows that the central fluid gels in just an additional 2–4 seconds, indicating that the fluid would flow only an additional 2–4 cm under these conditions. Once again, the reaction at the far end of the cavity is very rapid, and it reaches full conversion first. The cure near the gate region still lags, but it is faster than the results for ($T_w=70$, $T_o=30$) or ($T_{wo}=110$, $T_o=30$). An additional 13 seconds is needed before the part can be ejected. The clear implication here is that heating of the resin or its components is much more effective in promoting conversion during filling and minimizing the cycle time than heating of the mold wall. This is reasonable in light of the high activation energy and low thermal conductivity of most reaction molding resins. In this way, the simulation can be used to optimize the resin temperature to minimize the overall cycle time. In general, though, greater conversion during filling does not guarantee a shorter cycle time because the conversion is usually nonuniform, and therefore localized areas of resin fluid may remain unactivated and lag behind the rest of the cavity.

Heating (or cooling) of the cavity wall can be used to compensate for such problems as indicated by the above analysis. This heating or cooling can be nonuniform if required. For example, to prevent degradation of the polymer material in the mold cavity, the cavity wall can be cooled. As the exotherm of the resin material typically raises the temperature most in thicker portions of the mold, the wall surrounding such thicker portions can be cooled more, as compared to other portions of the wall. Also, higher temperatures tend to promote polymerization of the resin. Thus, to prevent clogging, portions of the wall can be cooled to prevent premature gelation as required. Conversely, portions of the wall can be heated to promote curing in areas that would otherwise be slower to cure than the rest of the material. If relatively uniform heating or cooling of the resin is desired, the resin itself or components thereof can be heated or cooled prior to introduction into the cavity. Also, to effectively cool a resin, extender material (nonreactive components) can be added, which reduces the amount of exothermic heat produced.

STABILITY LIMITS FOR RIM

The foregoing analysis yields data on (1) chemical conversion; (2) temperature; (3) viscosity; (4) velocity; and (5) pressure of the resin as it fills the mold cavity, and thereafter as it cures.

This data is useful in predicting successful moldability of a given prepolymer resin in a given mold. Some stability considerations and typical criteria are listed below, with others that can be applied by persons skilled in the reaction injection molding art.

Velocity: The maximum velocity should be below the value that produces turbulent flow in the cavity, or a portion thereof, to prevent "jetting" and other instabilities that result in uneven filling of the mold cavity. The Reynolds number (R) should be maintained at less than 2,000, and preferably less than 1,000, to ensure laminar (nonturbulent) flow, where $$R = \rho \times D \times V(\text{ave})/\mu$$

where $\rho$ = fluid density; D = diameter (or thickness) of the flow area; V (ave) = average velocity in the flow area; $\mu$ = viscosity of the fluid.

The value of D is initially that of the cavity but is reduced during filling by any amount of gelation that occurs, which can also be determined by the present technique (see below).

In the RIM art, even more strict limits on velocity are sometimes imposed: V < 2.5 meters/sec for thin parts (D < 6 mm); V < 1.2 meters/sec for thicker parts. (See D. J. Prepelka and J. L. Wharton, *Journal of Cellular Plastics*.)

Chemical Conversion: The value of x should be maintained below $x_{gel}$ in the center of the cavity for the particular resin used. A high conversion at the center of the channel indicates that gelation is imminent. For the urethane material used herein, gelation occurs at about 60 percent of full conversion; for epoxy resins, it occurs at about 20-30 percent of full conversion, etc.

Pressure: The pressures referred to herein are given in terms of pounds per square inch in excess of atmospheric pressure, which is known in the art as "gauge pressure", and designated herein as "psig". 200 psig is commonly accepted as the maximum pressure that persists during reaction molding. Higher pressure causes excessive seepage of low viscosity fluid out of the mold cavity. Also, 200 psig is near the maximum value of most clamps designed specifically for RIM.

Temperature: The temperature should not exceed the degradation temperature at any time during filling or curing.

In addition, most molding resins show an "ignition temperature", a temperature at which the reaction rate is greatly accelerated. In essence, this temperature should be avoided, particularly in the center of the cavity where it could trigger flow seizure.

The above analysis has been described mainly in terms of filling a mold cavity from which an at least partially polymerized article is removed after a period of time. However, the analysis can also predict resin behavior in the runner lines used to supply the cavity. For example, "transfer molding" is a single component resin process wherein the prepolymer resin is heat activated. Typically, some degree of curing (polymerization) occurs in the runner lines. In that case, the present technique can be used to evaluate the degree of chemical conversion, etc., that occurs in the runner lines, to ensure, e.g., that blockage does not occur. In that case, the runner line is considered to be the "cavity" herein. The analysis can then be applied to evaluate the further polymerization of the resin in the mold cavity, as above.

Other useful moldability criteria and techniques for optimizing the moldability of articles can be developed for use with the inventive analysis technique shown herein.

All such variations and deviations through which the present teaching has advanced the art are considered to be within the spirit and scope of the present invention.

What is claimed is:

1. A method of making an article by steps comprising flowing at least one fluid into a cavity, and reacting said fluid so as to produce an at least partially polymerized material in said cavity, wherein said fluid comprises a thermosetting fluid, and the parameters of said reacting are chosen so that said fluid in said cavity does not exceed desired limits on at least one of the factors of (1) chemical conversion or (2) temperature, whereby said at least one of the factors is determined by steps comprising simulating said flowing of said fluid by steps comprising dividing said cavity into a plurality of cells, assigning a marker to each cell for carrying information comprising the temperature, chemical conversion, viscosity, and velocity of the fluid in the cell, performing computations to determine said information, moving the marker a distance determined by the computed velocity, and iterating said computations for said fluid during the simulating of said flowing until said cavity is filled with said fluid, and thereafter continuing to compute at least one of said factors, utilizing as an initial condition therefor the final value of said factor computed for the simulating of said flowing.

2. The method of claim 1 further comprising the step of supplying external heat to said fluid, thereby reducing the residence time of said material in said cavity.

3. The method of claim 1 further comprising the step of supplying external heat to at least a portion of the wall of said cavity, thereby reducing the residence time of said material in said cavity.

4. The method of claim 1 further comprising the step of maximizing the rate of flow of said fluid during said flowing while avoiding flow instability, thereby reducing the residence time of said material in said cavity.

5. The method of claim 1 further comprising the step of choosing said fluid so as to have initial parameters suitable to obtaining a reduced residence time of said material in said cavity.

6. The method of claim 1 further comprising the step of choosing the shape of said cavity so as to reduce the residence time of said material in said cavity.

7. The method of claim 1 further comprising the step of choosing said parameters so as to promote thermal runaway of said fluid as it polymerizes in at least a portion of said cavity.

8. The method of claim 1 further comprising the step of cooling at least one portion of the wall of said cavity as compared to at least one other portion, thereby reducing thermal degradation of said material in said cavity.

9. The method of claim 1 further comprising the step of cooling at least one portion of the wall of said cavity as compared to at least one other portion, thereby preventing clogging of said fluid in at least a portion of said cavity.

* * * * *